(12) United States Patent
Hensler et al.

(10) Patent No.: US 10,654,334 B2
(45) Date of Patent: May 19, 2020

(54) VEHICLE HVAC SYSTEM

(71) Applicant: Calsonic Kansei North America, Inc., Farmington Hills, MI (US)

(72) Inventors: Aaron Kirk Hensler, South Lyon, MI (US); Ichiro Miyata, Commerce Township, MI (US)

(73) Assignee: Calsonic Kansei North America, Inc., Farmington Hills, MI (US)

(*) Notice: Subject to any disclaimer, the term of this patent is extended or adjusted under 35 U.S.C. 154(b) by 251 days.

(21) Appl. No.: 15/836,423

(22) Filed: Dec. 8, 2017

(65) Prior Publication Data
US 2018/0162190 A1 Jun. 14, 2018

Related U.S. Application Data

(60) Provisional application No. 62/432,413, filed on Dec. 9, 2016.

(51) Int. Cl.
*B60H 1/00* (2006.01)
*B60H 1/32* (2006.01)

(52) U.S. Cl.
CPC ....... *B60H 1/00028* (2013.01); *B60H 1/0005* (2013.01); *B60H 1/00678* (2013.01); *B60H 1/00685* (2013.01); *B60H 1/00842* (2013.01); *B60H 1/3202* (2013.01); *B60H 1/00064* (2013.01); *B60H 1/00528* (2013.01); *B60H 1/00564* (2013.01); *B60H 2001/00135* (2013.01); *B60H 2001/00178* (2013.01)

(58) Field of Classification Search
CPC .............. B60H 1/0005; B60H 1/00028; B60H 1/00678; B60H 1/00685; B60H 1/00842; B60H 1/3202; B60H 1/00064; B60H 1/00528; B60H 1/00564; B60H 2001/00178; B60H 2001/002; B60H 2001/00135; F25D 21/002
USPC ............................................ 165/43, 47, 203
See application file for complete search history.

(56) References Cited

U.S. PATENT DOCUMENTS

| 5,448,788 | A | 1/1995 | Wu |
| 6,040,561 | A | 5/2000 | Murty |
| 2002/0125243 | A1 | 9/2002 | Lange |

(Continued)

FOREIGN PATENT DOCUMENTS

GB 1490336 11/1977

*Primary Examiner* — Joel M Attey
(74) *Attorney, Agent, or Firm* — Foley & Lardner LLP

(57) ABSTRACT

An HVAC system for a vehicle includes a housing, an evaporator disposed in the housing, and a heater disposed in the housing. The HVAC system further includes a bypass opening defined between an upper end of the evaporator and an upper end of the heater and an intermediate chamber defined by the evaporator, the heater, the housing, and the bypass opening. The HVAC system further includes an upper outlet passage configured to direct air from the HVAC system into a passenger compartment of a vehicle. The evaporator is configured to output a first stream of air into the intermediate chamber and the HVAC system is configured to operate in a first operating condition in which a first portion of the first stream of air will pass through the heater and a second portion of the first stream will bypass the heater by passing from the intermediate chamber through the bypass opening and into the upper outlet passage.

16 Claims, 8 Drawing Sheets

(56) References Cited

U.S. PATENT DOCUMENTS

| | | | |
|---|---|---|---|
| 2003/0116303 A1* | 6/2003 | Kang | B60H 1/00064 |
| | | | 165/42 |
| 2007/0262162 A1* | 11/2007 | Karamanos | F24F 13/1413 |
| | | | 236/49.3 |
| 2009/0165991 A1* | 7/2009 | Komaba | B60H 1/00028 |
| | | | 165/42 |
| 2010/0140245 A1 | 6/2010 | Lim | |
| 2015/0059375 A1* | 3/2015 | Oomura | B60H 1/00785 |
| | | | 62/155 |

* cited by examiner

VEHICLE HVAC SYSTEM

CROSS-REFERENCE TO RELATED APPLICATION

This application claims the benefit of and priority to U.S. Provisional Patent Application No. 62/432,413, filed Dec. 9, 2016, which is incorporated by reference herein in its entirety.

BACKGROUND

The present application relates generally to the field of heating, ventilation, and air conditioning ("HVAC") systems for vehicles.

A conventional HVAC system for a vehicle uses heat produced by an internal combustion engine to heat air passing through the HVAC system and into the passenger compartment. These systems use a mixing chamber to mix a supply of hot and cold air, resulting in a mixture having a desired temperature. Due to the limits of the mixing chamber, these systems are limited in their abilities to provide streams of two different temperatures to a passenger and account for irregularities of airflow mixing at different temperatures and mass flow rates.

The separate hot and cold air supplies and mixing chamber result in energy losses due to flow stagnating in the mixing chamber. Furthermore, by mixing separate streams rather than heating one stream, a conventional HVAC system may result in uneven temperature distribution throughout the vehicle. It would therefore be advantageous to provide an improved HVAC system for vehicles that addresses these and other issues prevalent in conventional HVAC systems.

SUMMARY

One embodiment relates to an HVAC system for a vehicle, including a housing, an evaporator disposed in the housing, and a heater disposed in the housing. The HVAC system further includes a bypass opening defined between an upper end of the evaporator and an upper end of the heater and an intermediate chamber defined by the evaporator, the heater, the housing, and the bypass opening. The HVAC system further includes an upper outlet passage configured to direct air from the HVAC system into a passenger compartment of a vehicle. The evaporator is configured to output a first stream of air into the intermediate chamber and the HVAC system is configured to operate in a first operating condition in which a first portion of the first stream of air will pass through the heater and a second portion of the first stream will bypass the heater by passing from the intermediate chamber through the bypass opening and into the upper outlet passage.

Another embodiment relates to an HVAC system for a vehicle, including a heater disposed in a housing, the heater including a controller disposed at a lower end thereof, and a plurality of coils extending substantially upward from the controller. The HVAC system further includes a divider disposed on at least one coil. First and second compartments are defined on opposing sides of the divider and the first and second compartments are configured to receive separate streams of air at different temperatures.

Another embodiment relates to a method of operating a vehicle HVAC system, including outputting a first stream of air from an evaporator, passing a first portion of the first stream through a bypass opening defined between the evaporator and a heater to an upper outlet passage, and receiving a second portion of the first stream at the heater. The method further includes outputting a second stream from the heater, wherein the second stream is at a different temperature than the first stream, and passing a first portion of the second stream to a lower outlet passage.

DETAILED DESCRIPTION

Referring to the FIGURES generally, a heating, ventilation, and air conditioning ("HVAC") system for a vehicle is shown according to various exemplary embodiments.

Figure 1:
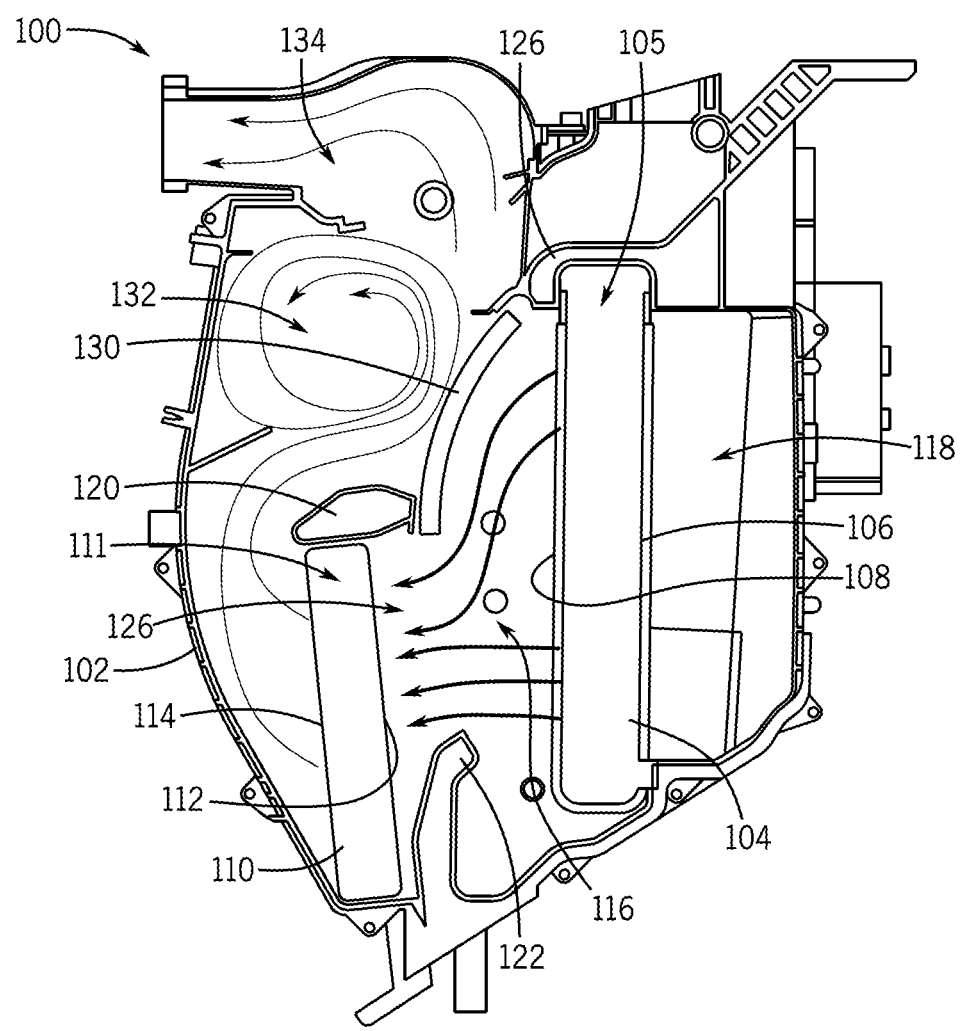
FIG. 1 is a cross-sectional view of a prior art HVAC system in a heating configuration.
Figure 2:
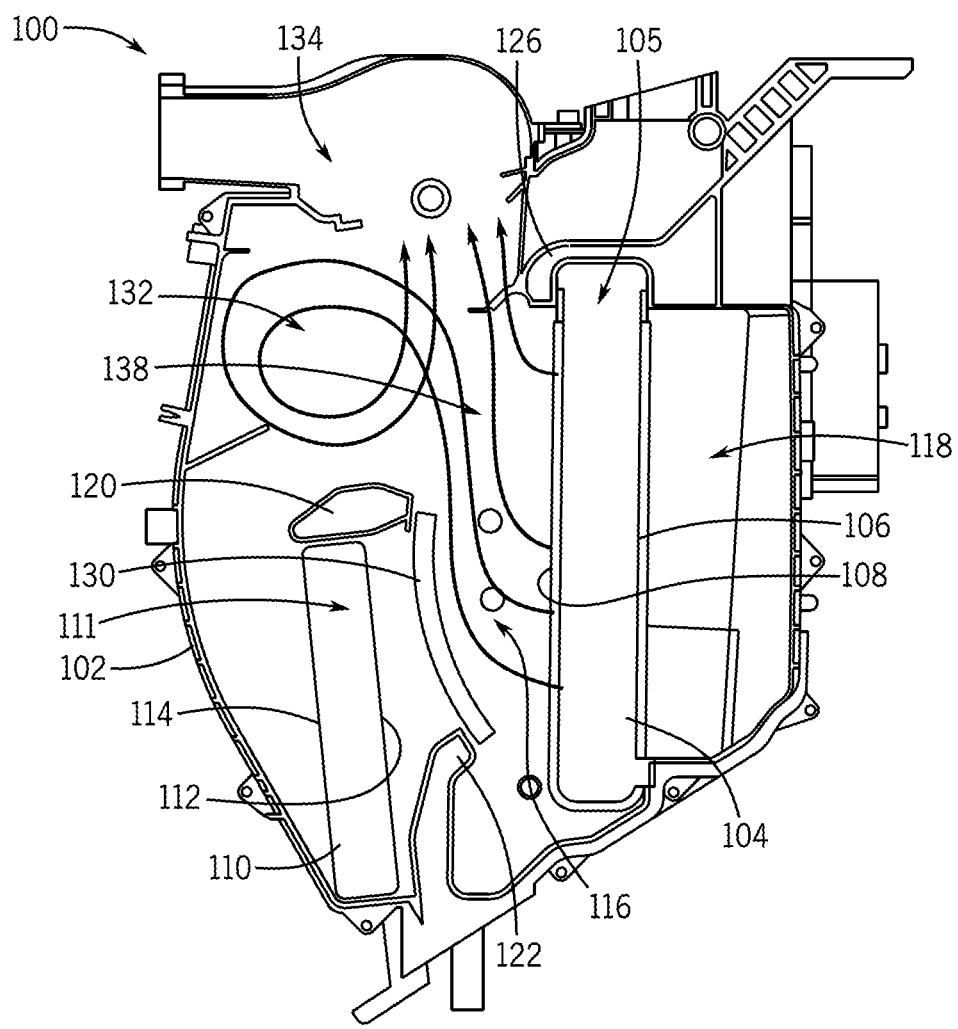
FIG. 2 is a cross-sectional view of the HVAC system shown in FIG. 1 in a cooling configuration.
Figure 3:
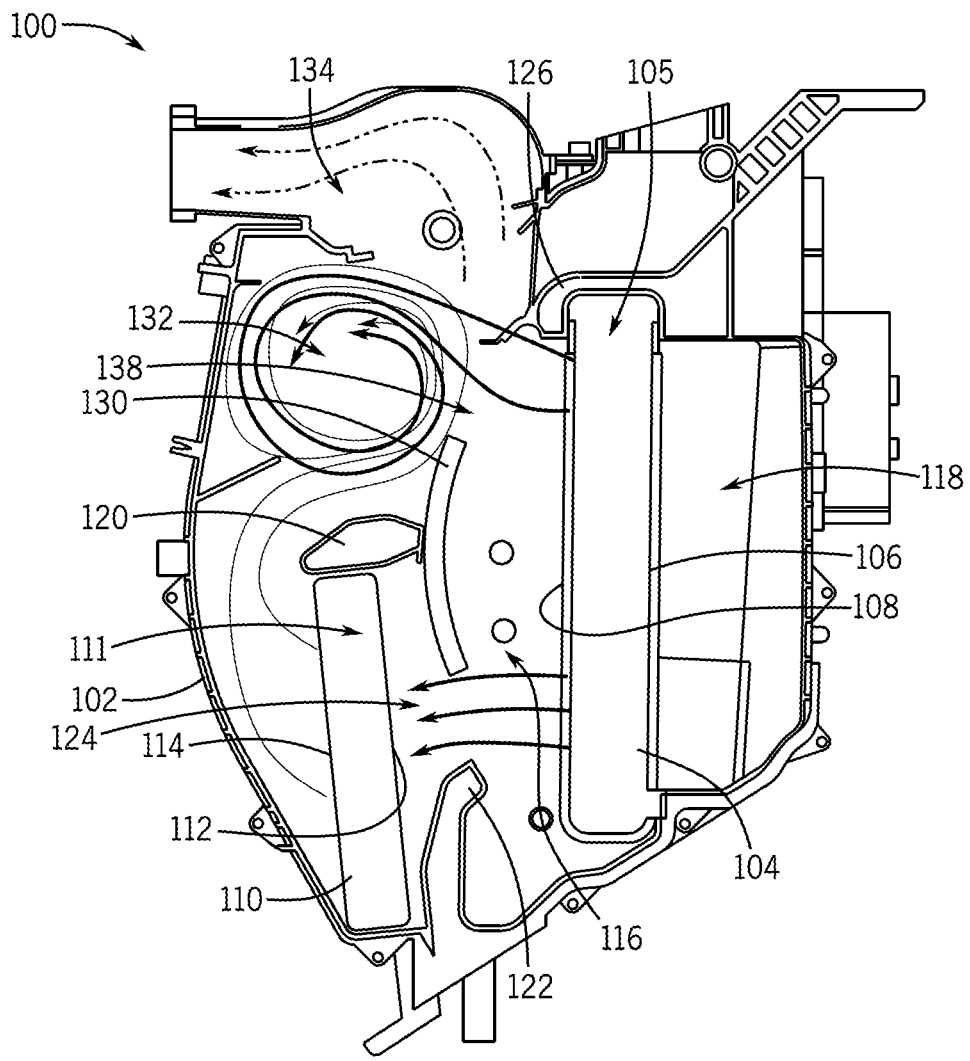
FIG. 3 is a cross-sectional view of the HVAC system shown in FIG. 1 in mixed temperature configuration.

Referring to FIGS. 1-3, a prior art HVAC system 100 is shown. The HVAC system 100 includes a housing 102 configured to house an evaporator 104 having an evaporator inlet 106 and an evaporator outlet 108, and a heater 110 having a heater inlet 112 and a heater outlet 114. The heater 110 is spaced apart from the evaporator 104, defining an intermediate chamber 116 therebetween. For example, the intermediate chamber 116 may be defined upstream by the evaporator outlet 108 and downstream by the heater inlet 112. At least a portion of the housing 102 or other structure may extend between the evaporator 104 and the heater 110, defining side and lower surfaces of the intermediate chamber 116. The heater 110 may be fluidly coupled to the evaporator 104 through (i.e., via) the intermediate chamber 116.

The evaporator 104 is configured to cool air passing therethrough. For example, when the evaporator 104 is operated, heat is transferred from the air to a medium passing within the evaporator 104, thereby cooling the air passing therethrough. In this configuration, when the evaporator 104 is running, the HVAC system 100 may be operating as an air conditioner for lowering the temperature inside the vehicle. The evaporator 104 may be configured to adjust the humidity level of the air passing therethrough. Furthermore, air may pass through the evaporator 104 to the heater 110, while the evaporator 104 is not operating. In this configuration, the evaporator 104 does not change the temperature or humidity of the air, which is then received by the heater 110 at an ambient temperature and humidity. The heater 110 is configured to heat air passing therethrough. Heat may be transferred from an internal combustion engine or other heat source, to the air passing through the heater 110. For example, heated fluid from the engine may pass through the heater 110 for transferring heat. In this configuration, the transfer of heat may be limited until the engine achieves a certain minimum operating temperature greater than an ambient air temperature. In other configurations, the heater 110 may heat the air in other ways, as will be discussed below, with reference to FIGS. 4-6.

Referring to FIGS. 1-3, the HVAC system 100 further includes an inlet passage 118 (i.e., duct, conduit, etc.) configured to receive air for heating and/or cooling and subsequent introduction to a passenger compartment of a vehicle. The inlet passage 118 is disposed within the housing 102, upstream from the evaporator 104 and configured to supply air directly to the evaporator 104, although in other configurations, the inlet passage 118 may be separately formed from the housing 102 and fluidly coupled to the evaporator 104 through a port.

The heater 110 may be disposed between a heater support 120 and the housing 102, such that an upper end 111 of the heater 110 is coupled to the heater support 120 for holding the heater 110 in place. A finger 122 may extend substantially inward from the housing 102 into the intermediate chamber 116, defining a heater opening 124 between the heater support 120 and the finger 122 for channeling air in the intermediate chamber 116 to the heater inlet 112. An evaporator bracket 126 may be integrally formed with the housing 102 and extend substantially inward from the housing 102, such that an upper end 105 of the evaporator 104 may be coupled to the evaporator bracket 126 for holding the evaporator 104 in place. The evaporator bracket 126 may be integrally formed with the housing 102, although in other configurations, the evaporator bracket 126 may be formed in other ways.

A mixing door 130 is configured to extend between the evaporator 104 and the heater 110, such that the mixing door 130 may at least partially enclose the intermediate chamber 116 between the evaporator 104 and the heater 110. As shown in FIG. 1, the mixing door 130 may be positioned (i.e., extend) between the heater support 120 and the evaporator bracket 126. In this configuration, the intermediate chamber 116 is fully enclosed by the mixing door 130, such that substantially all of the air output by the evaporator 104 is received by the heater 110.

The heater 110 then heats the air and outputs a heated air stream to a mixing chamber 132. In the mixing chamber 132, the heated air stream produces a vortex for inducing mixing with other air streams. This flow of the heated air stream in the mixing chamber 132 may result in increasing turbulence. The heated air stream is then output from the mixing chamber 132 into an outlet passage 134 (i.e., duct, conduit, etc.) and vented to the passenger cabin. The outlet passage 134 may be configured to supply the heated air stream to various vents in the passenger cabin. For example, vents may include upper vents configured to supply air proximate to a passenger's face, lower vents configured to supply air proximate to a passenger's feet, and defrosting vents configured to supply air proximate to various windows (e.g., windshield, side windows) of the vehicle.

Referring now to FIG. 2, the mixing door 130 may be rotated along a track or translated in other ways, such that a mixing opening 138 is defined at an upper end of the intermediate chamber 116 for passing air from the evaporator 104 to the outlet passage 134. As shown in FIG. 2, the mixing door 130 is positioned (i.e., extends) between the heater support 120 and the finger 122, such that passage of air through the heater opening 124 is substantially blocked. The heater opening 124 may be sized to be smaller than the mixing door 130, such that substantially the entire heater opening 124 may be covered by the mixing door 130, although in other configurations, the mixing door 130 may not completely cover the heater opening 124. In the configuration shown in FIG. 2, an air stream output from the evaporator 104 passes through the mixing opening 138 to the mixing chamber 132 and the outlet passage 134. At least a portion of the air stream produces a vortex in the mixing chamber 132 before passing to the outlet passage 134 with a higher turbulent flow. This configuration may provide a cold air stream to the passenger compartment by cooling the air in the evaporator but not heating the air in the heater.

Referring now to FIG. 3, the mixing door 130 is shown in a middle position for providing a stream of air at the outlet passage 134 at a medium temperature (e.g., greater than a coldest temperature in the configuration of FIG. 2 and less than a hottest temperature in the configuration of FIG. 1). In the middle position, the mixing door 130 covers a portion of the heater opening 124 and a portion of the mixing opening 138, such that the air output by the evaporator 104 forms at least two (i.e., first and second) streams. A first stream is configured to flow from the evaporator 104, through a portion of the heater opening 124 defined between the finger 122 and the mixing door 130. The portion of the heater opening 124 is less than the total cross-sectional area of the heater opening 124, restricting the flow of air therethrough. The first stream is then heated in the heater 110 and output as a heated stream to the mixing chamber. A second stream is configured to flow from the evaporator 104, through a portion of the mixing opening 138 defined between the evaporator bracket 126 and the mixing door 130. The portion of the mixing opening 138 is less than the total cross-sectional area of the mixing opening 138, restricting the flow of air therethrough. The second stream is fed to the mixing chamber 132 and forms a vortex with the heated stream such that the second stream and the heated stream are at least partially mixed and form a mixed output stream. The output stream then passes to the outlet passage 134.

The first stream is heated in the heater 110, forming the heated stream and the second stream 104 may be either cooled in the evaporator 104 or provided at ambient temperature, such that the second stream is colder than the heated stream. The temperature of the output stream may be determined, at least in part, by the relative volume flow rate of the first and second streams. Specifically, in order to adjust the temperature of the output stream in the outlet passage 134, the mixing door 130 may be repositioned to change the volume flow rates of each of the first and second streams.

The temperature of the output stream may be increased by receiving a larger volume of the heated stream and a smaller volume of the second stream in the mixing chamber 132. For example, the volume flow rate of the first stream may be increased and the volume flow rate of the second stream may be decreased by repositioning the mixing door 130 to cover a greater portion of the mixing opening 138 and a smaller portion of the heater opening 124. In this configuration, the volume of air passing through the heater 110 is increased and the volume of air passing through the mixing opening 138 is decreased. The mixing chamber 132 then receives a larger volume from the heated stream and a smaller volume from the second stream, such that the temperature of the mixed output stream, combining the heated stream and the second stream, is increased.

The temperature of the output stream may be decreased by receiving a smaller volume of the heated stream and a larger volume of the second stream in the mixing chamber 132. For example, the volume flow rate of the first stream may be decreased and the volume flow rate of the second stream may be increased by repositioning the mixing door 130 to cover a smaller portion of the mixing opening 138 and a greater portion of the heater opening 124. In this configuration, the volume of air passing through the heater 110 is decreased and the volume of air passing through the mixing opening 138 is increased. The mixing chamber 132 then receives a smaller volume from the heated stream and a larger volume from the second stream, such that the temperature of the mixed output stream, combining the heated stream and the second stream, is decreased.

Figure 4:
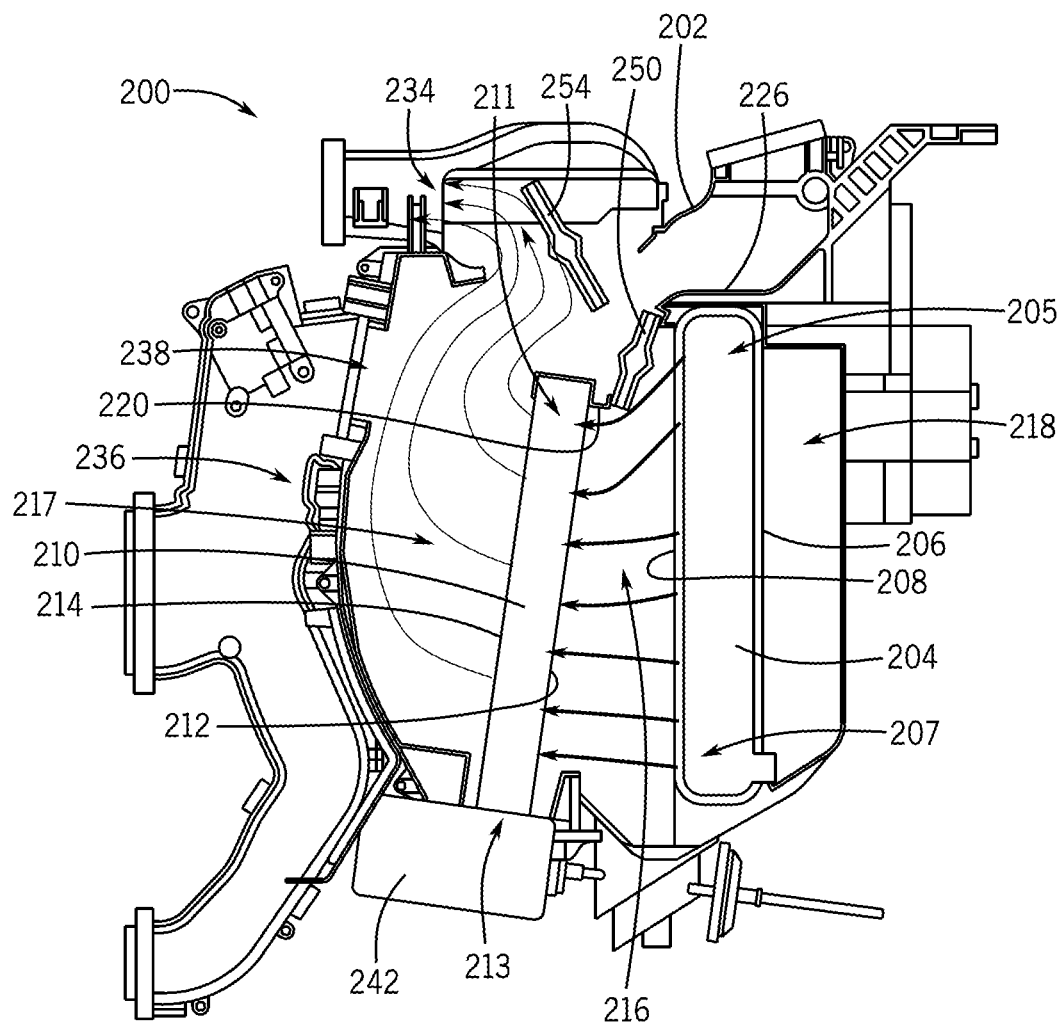
FIG. 4 is a cross-sectional view of an HVAC system in a heating configuration, according to an exemplary embodiment.
Figure 5:
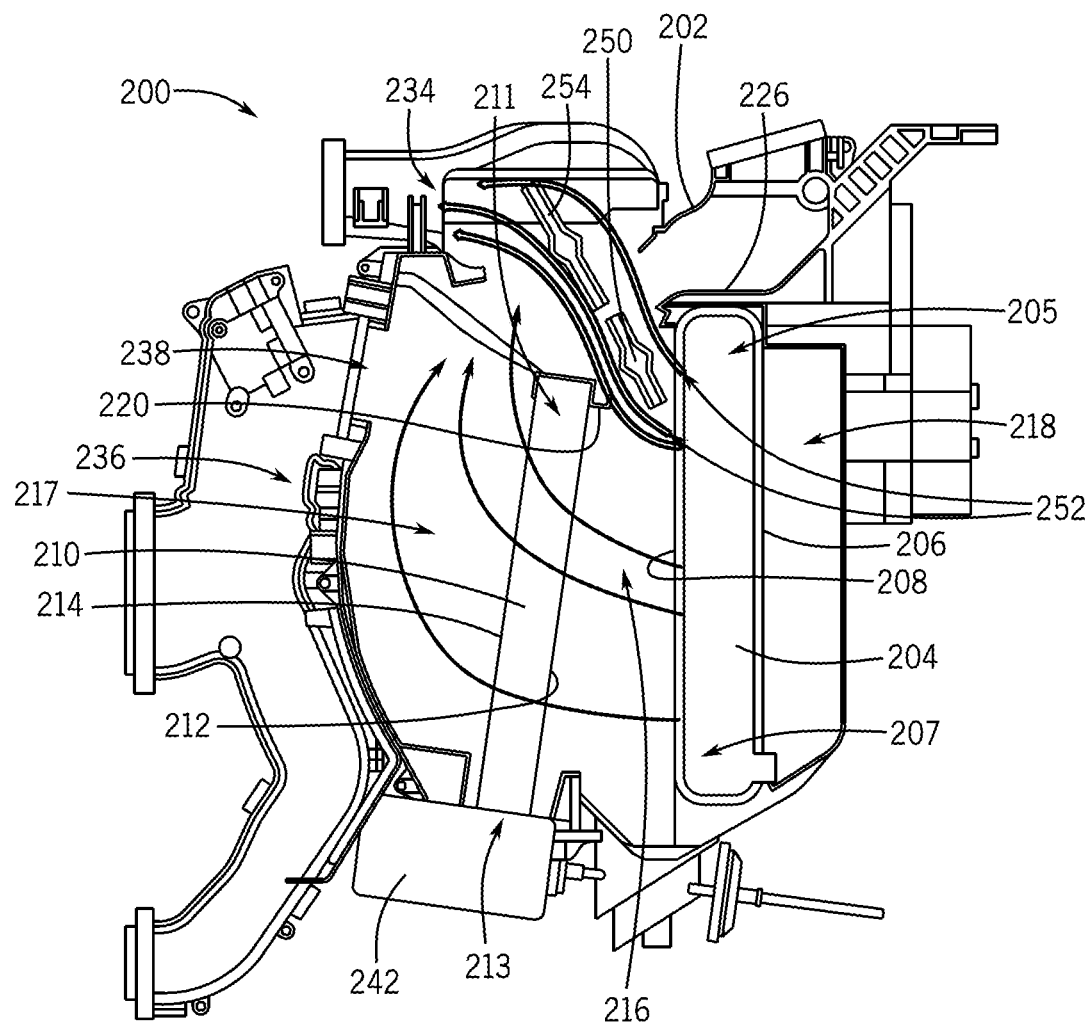
FIG. 5 is a cross-sectional view of the HVAC system shown in FIG. 4 in a maximum cooling configuration.
Figure 6:
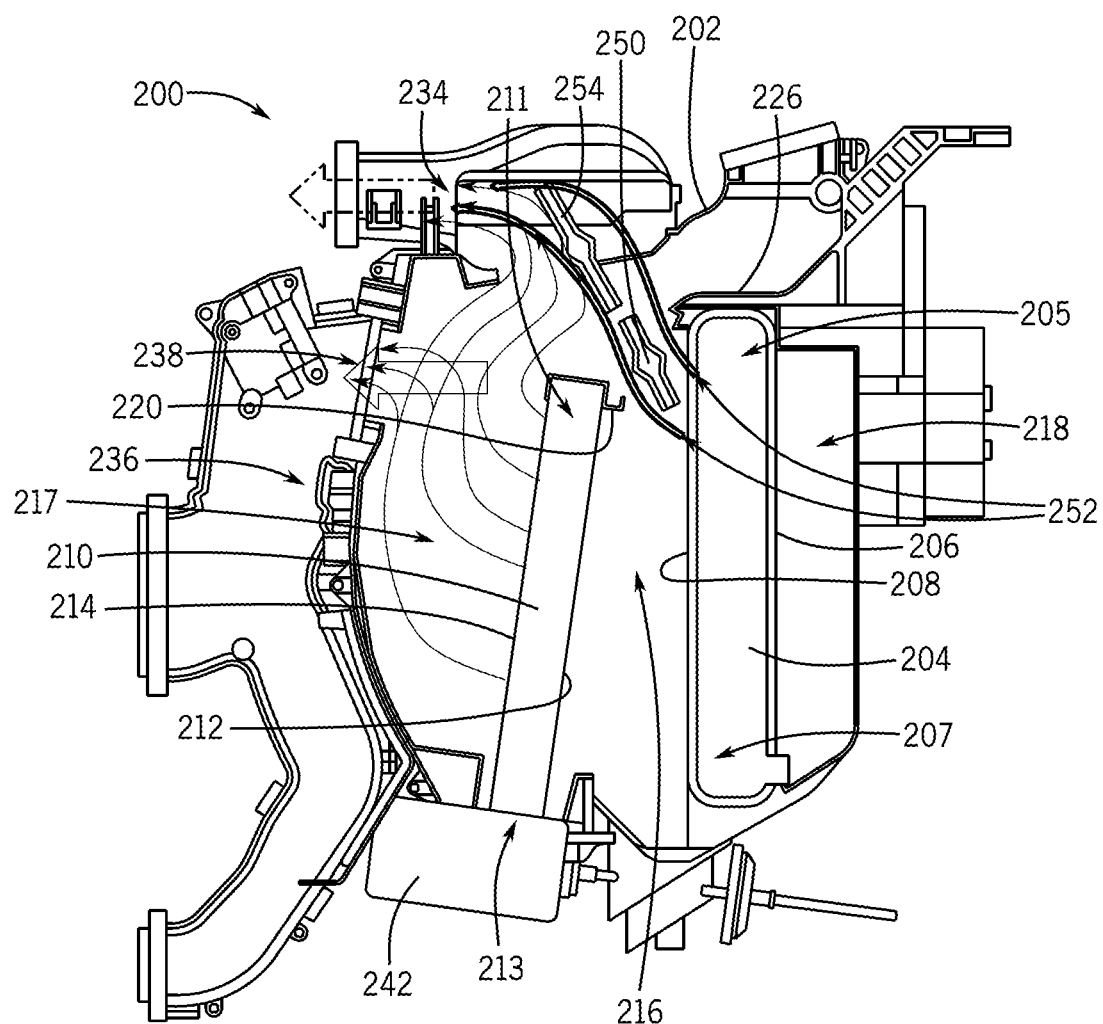
FIG. 6 is a cross-sectional view of the HVAC system shown in FIG. 4 in a two-stage temperature output configuration.

Referring now to FIGS. 4-6, an HVAC system 200 is shown according to an exemplary embodiment. The HVAC system 200 includes a housing 202 configured to house an evaporator 204 having an evaporator inlet 206 and an evaporator outlet 208, and a heater 210 having a heater inlet 212 and a heater outlet 214. The heater 210 is spaced apart from the evaporator 204, defining an intermediate chamber 216 therebetween. For example, the intermediate chamber 216 may be defined upstream by the evaporator outlet 208 and downstream by the heater inlet 212. At least a portion of the housing 202 or other structure may extend between the evaporator 204 and the heater 210, defining side and lower surfaces of the intermediate chamber 216. The heater 210 may be fluidly coupled to the evaporator 204 through (i.e., via) the intermediate chamber 216.

The evaporator 204 is configured to cool air passing therethrough. For example, when the evaporator 204 is operated, heat is transferred from the air to a medium passing within the evaporator 204, thereby cooling the air passing therethrough. In this configuration, when the evaporator 204 is running, the HVAC system 200 may be operating as an air conditioner for lowering the temperature inside the vehicle. According to another exemplary embodiment, the evaporator 204 may be configured to adjust the humidity level of the air passing therethrough. According to another exemplary embodiment, air may pass through the evaporator 204 to the heater 210, while the evaporator 204 is not operating. In this configuration, the evaporator 204 does not change the temperature or humidity of the air, which is then received by the heater 210 at an ambient temperature and humidity.

Figure 8:
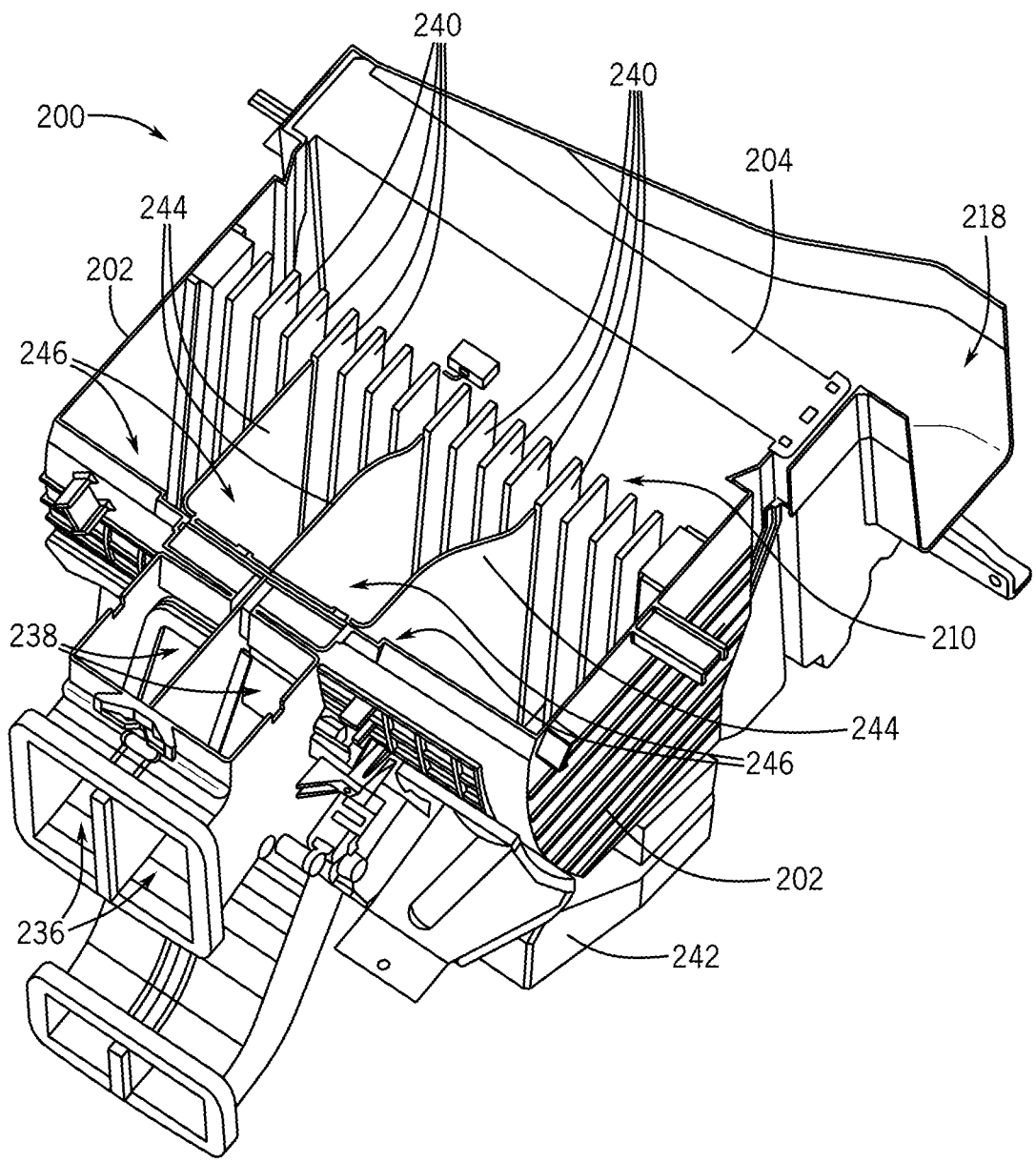
FIG. 8 is a sectional view of the HVAC system shown in FIG. 7.

The heater 210 is configured to heat air passing therethrough. According to an exemplary embodiment, the heater 210 may be a positive temperature coefficient ("PTC") heater or other form of resistance heater. As shown in FIG. 8, for example, the heater 210 may include a plurality of electrical coils 240. An electric current is supplied to the coils 240 until the coils 240 are heated and reach a desired temperature. For example, the coils 240 may be heated to a temperature higher than a desired temperature for the passenger compartment, such that enough heat is transferred from the coils 240 to the air as the air passes from the heater inlet 212, past the plurality of coils 240, to the heater outlet 214. Once the coils 240 reach the desired temperature, the current may be cycled on (i.e., flowing) and off (i.e., not flowing) to maintain the coils 240 at a substantially constant temperature. The temperature of the coils 240 and therefore the air flowing through the heater 210 may be adjusted by changing the frequency of supplying the current to the coils 240 and/or the period of supplying the current thereto. For example, the temperature of the coils 240 may be increased by increasing the period of supplying current to the coils 240 and decreasing the period during which current is not supplied. According to an exemplary embodiment, the coils 240 are configured to extend across substantially an entire height and/or width of the heater inlet 212 and/or heater outlet 214. In this configuration, a stream of air received by the heater 210 is heated substantially evenly, regardless of position in the heater 210, preventing or minimizing uneven temperature gradients within the stream.

Referring to FIGS. 4-6, the HVAC system 200 further includes an inlet passage 218 (i.e., duct, conduit, etc.) configured to receive air for heating and/or cooling and subsequent introduction to a passenger compartment of a vehicle. The inlet passage 218 is disposed within the housing 202, upstream from the evaporator 204 and configured to supply air from a blower 260 (see FIG. 7) directly to the evaporator 204, although according to other exemplary embodiments, the inlet passage 218 may be separately formed from the housing 202 and fluidly coupled to the evaporator 204 through a port. The blower 260 may be configured to control the flow speed of the air supplied to and/or output from the HVAC system 200. The HVAC system 200 may be configured to operate without receiving heat from an internal combustion engine. For example, the HVAC system 200 may be installed in electric vehicles, although according to other exemplary embodiments, the HVAC system 200 may be installed on vehicles with internal combustion engines and may or may not receive heat from the engine or a supply of air at the inlet passage 218 heated by the engine.

The heater 210 may be disposed between a heater support 220 and a portion of the housing 202, such that an upper end 211 of the heater 210 is coupled to the heater support 220 for holding the heater 210 in place. The heater 210 further includes a controller 242 (e.g., an electric current-generating device) disposed at a lower end 213 thereof. The controller 242 is configured to control the supply of current to the coils 240 in the heater 210. According to an exemplary embodiment, the controller 242 may be coupled to the housing 202, holding the heater 210 in place relative to the housing 202, and the coils 240 may extend into an interior portion of the housing 202. According to an exemplary embodiment, the controller 242 may define a portion of the intermediate chamber 216. For example, the controller 242 may be coupled to a bottom exterior surface (i.e., portion) of the housing 202 and disposed exterior to (i.e., outside of) the housing 202. The coils 240 may extend through an opening in the housing 202 into the interior portion thereof. According to an exemplary embodiment, an evaporator bracket 226 may extend substantially inward from the housing 202, such that an upper end 205 of the evaporator 204 may be coupled to the evaporator bracket 226 for holding the evaporator 204 in place. According to an exemplary embodiment, the evaporator bracket 226 may be integrally formed with the housing 202, although according to other exemplary embodiments, the evaporator bracket 226 may be formed in other ways.

As shown in FIGS. 4-6, the heater inlet 212 may have a height that is less than a height of the evaporator outlet 208. For example, the upper end 211 of the heater 210 may be disposed below (i.e., vertically offset from) the upper end 205 of the evaporator 204. Specifically the upper end 211 of the heater 210 may be positioned vertically between the upper end 205 of the evaporator 204 and a middle point of the evaporator 204, halfway between the upper end 205 and a lower end 207. A lower end 213 of the heater 210 may be substantially level with the lower end 207 of the evaporator 204. The heater 210 is in a tilted (i.e., angled) orientation relative to the evaporator 204, such that the upper end 211 of the heater 210 is tilted toward the evaporator 204. In this configuration, the upper end 211 of the heater 210 is disposed closer to the evaporator 204 than the lower end 213 is to the heater 210. According to other exemplary embodiments, the evaporator 204 and the heater 210 may have other dimensions and/or positions in the housing 202.

A bypass door 250 is configured to extend between the evaporator 204 and the heater 210, such that the bypass door 250 may at least partially enclose the intermediate chamber 216 between the evaporator 204 and the heater 210. The bypass door 250 may be configured to rotate (i.e., move, reorient, translate, etc.) between "open" and "closed" positions. For example, as shown in FIG. 4, the bypass door 250 may be positioned (i.e., extend) between the heater support 220 and the evaporator bracket 226 in the "closed" position (i.e., orientation). In this configuration, the intermediate chamber 216 is fully closed by the bypass door 250, such that substantially all of the air output by the evaporator 204 is delivered to the heater 210. The bypass door 250 blocks a bypass opening 252 defined between the upper end 205 of the evaporator 204 and the upper end 211 of the heater 210, such that air is prevented from passing through the bypass opening 252. As discussed above, the upper end 211 of the heater 210 is tilted toward the evaporator 204. In this configuration, the size of the bypass opening 252 is minimized, reducing the size and space required to fit the bypass door 250 and increasing the size and capacity of an upper outlet passage 234. According to an exemplary embodiment, due to the vertical offset of the upper end 211 of the heater 210 from the upper end 205 of the evaporator 204, the bypass opening 252 and therefore the bypass door 250 as shown in FIG. 4 in the "closed" position may be disposed on a substantially downward angle from the evaporator 204 to the heater 210. While FIGS. 4-6 show the bypass door 250 configured to rotate about a central axis, according to other exemplary embodiments, the bypass door 250 may open and close in other ways (e.g., as a flap, valve, etc.).

As shown in FIG. 4, the evaporator 204 receives a supply of air from the inlet passage 218 and outputs a first stream of air. The evaporator 204 may receive air at an ambient or other temperature. As discussed above, the evaporator 204 may operate to cool the air and output the first stream at a colder temperature than ambient and/or adjust the humidity of the first stream relative to ambient. According to another exemplary embodiment, the air may be passed through the evaporator 204 without the evaporator 204 in operation, such that the first air stream maintains the ambient characteristics.

Referring to FIG. 4, the heater 210 receives substantially all of the first stream and outputs a second stream in a heater passage 217 defined between the heater 210 and the housing 202. The heater passage 217 may be configured to maintain the second stream in a substantially laminar flow. According to an exemplary embodiment, the heater 210 may be operated as described above such that the second stream is at a higher temperature than the first stream. In this configuration, the second stream may be heated to a desired temperature of the passenger compartment. In contrast to FIG. 3, in FIG. 4, the heater 210 may output a mid-level temperature (less than a hottest possible temperature and greater than a coldest possible temperature) without overheating the second stream and re-mixing the second stream with the cooler first stream to cool the second stream to a mid-level temperature. Instead, FIG. 4 shows a single flow path that only heats the second stream up to the desired temperature. In this configuration, the heating capacity of the heater 210 may be decreased because less heat is wasted due to subsequent cooling. Furthermore, the single flow path increases the overall operational efficiency of the HVAC system 200 during mid-level temperature settings by reducing and/or eliminating excess heating. For example, the reduced heating capacity of the heater 210 may result in lower energy consumption and operating costs for the HVAC system 200. According to another exemplary embodiment, the first stream may pass through the heater 210 to produce the second stream when the heater 210 is not in operation. In this configuration, the system 200 may be operating as an air conditioner, such that the evaporator 204 cools the first stream. The heater 210 may output the second stream at substantially the same temperature as the first stream and into the passenger compartment.

Because the temperature of the second stream can be precisely controlled by the heater 210, the second stream may be fed directly to the upper (i.e., first) outlet passage 234 without first passing through a mixing chamber. In this configuration, the second stream is received in the outlet passage 234 as an output stream with a substantially homogeneous temperature therethrough, resulting in more even heating and cooling of the passenger compartment. For example, in a conventional vehicle, the output stream may be further divided in ductwork to more than one vent to the passenger compartment. With a substantially homogeneous temperature distribution in the output stream, temperatures may be substantially consistent between the various vents. Furthermore, because the second stream is not subject to mixing in a mixing chamber, the flow throughout the HVAC system 200 is substantially more laminar than with a mixing chamber, thereby reducing energy losses due to generating a turbulent flow (e.g., drag, resistance, etc.), and producing a higher output flow rate and/or reducing capacity requirements for the blower 260. For example, a smaller or lower output blower 260 with lower energy demands may be used to achieve the same output stream with quieter operation. Similarly, the improved laminar flow in the HVAC system 200 may further result in quieter operation than a system with a mixing chamber. According to an exemplary embodiment, the HVAC system 200 without a mixing chamber may be enclosed in a smaller housing 202 and utilize less space in the vehicle.

Referring to FIGS. 4 and 5, substantially all of the second stream may be received in the upper outlet passage 234, forming a substantially laminar flow. The upper outlet passage 234 may be fluidly coupled to various vents in the passenger compartment (e.g., via ducts, passages, conduits, etc.). A vane 254 may be disposed in the upper outlet passage 234, proximate to and configured to fluidly interact with the bypass door 250, such that the second stream is redirected and maintains a substantially laminar flow. According to an exemplary embodiment, the vane 254 may be a door (i.e., second door, second bypass door, upper outlet passage door, outlet flow door, etc.) configured to articulate between open and closed positions (e.g., similarly to the bypass door 250) or may be generally stationary. For example, the vane 254 may articulate to adjust flow through the upper outlet passage 234. According to another exemplary embodiment, the bypass door 250 may be coupled to or form at least a portion of the vane 254. As discussed above, the HVAC system 200 does not include a mixing chamber for mixing the first and second streams. In this configuration, the second stream is passed directly to the upper outlet passage 234 without first mixing with the first stream and disrupting the laminar flow.

Referring now to FIG. 5, the HVAC system 200 is shown in a maximum cold configuration, according to an exemplary embodiment. In this configuration, the bypass door 250 is in the "open" position, such that at least a portion (i.e., a first portion) of the first stream (i.e., a bypass stream, a cooling stream, a third stream, etc.) proximate to the upper end 205 of the evaporator 204 is passed through the bypass opening 252, directly to the upper outlet passage 234, without first passing through the heater 210. The evaporator 204 may be operated at a maximum cold (i.e., coldest) setting, cooling air received by the evaporator 204 such that the first stream is at a lower temperature than an ambient temperature. According to another exemplary embodiment, the evaporator 204 may not be operated, such that the bypass stream is at an ambient temperature. As shown in FIG. 5, the bypass door 250 is disposed at a height in the HVAC system 200, such that when the bypass door 250 is in the "open" position, at least a portion of the bypass door 250 may overlap the evaporator outlet 208. Referring still to FIG. 5, the upper outlet passage 234 includes a vane 254 disposed therein, the vane 254 configured to interact with the bypass door 250 to redirect the first portion of the first stream through the upper outlet passage 234 and into the passenger compartment (e.g., through ducts, vents, etc.). For example, the vane 254 and the bypass door 250 may be oriented substantially coplanar or forming a substantially faired, continuous surface. The vane 254 as shown in FIGS. 4-6 is stationary, although according to other exemplary embodiments, the vane 254 may be configured to rotate to substantially align with an orientation of the bypass door 250 in the "open" position.

As shown in FIG. 5, another portion (i.e., a second portion, a remaining portion) of the first stream may still pass through the heater 210 when the bypass door 250 is in the "open" position, and form the second stream. According to other exemplary embodiments, substantially all (e.g., most, a majority, etc.) of the first stream may be redirected through the bypass door 250 to form the bypass stream, such that no second stream is output from the heater 210. In either configuration, with the bypass door 250 in the "open" position, a pressure drop between the chamber 216 and the upper outlet passage 234 is minimized or eliminated. For example, by reducing or eliminating the flow of the first stream through the heater 210 before introduction to the upper outlet passage 234, the first stream is subject to less overall pressure change due to resistance (e.g., drag) due to flow through the heater 210. By reducing the pressure drop, the HVAC system 200 increases the output stream flow rate and/or reduces the capacity requirements for the blower 260.

According to another exemplary embodiment, the bypass door 250 reduces the time to reduce the temperature of the output stream in the upper outlet passage 234. As shown in FIG. 3, when the HVAC system 100 is at a mid-level temperature, the heated air stream is present in the mixing chamber 132. When the mixing door 130 is then moved to the cooling position shown in FIG. 2, before the output stream is completely cooled, the heated air stream must be passed from the mixing chamber 132 out the outlet passage 134. The presence of the heated air stream in the mixing chamber 132 increases the overall time to providing a cooled output stream to the passenger compartment. In contrast, as shown in FIG. 5, the temperature of the output stream may be lowered faster by opening the bypass door 250. When the bypass door 250 is reoriented from the "closed" position shown in FIG. 4 to the "open" position shown in FIG. 5, the second stream may be bypassed, such that the second stream is held between the heater outlet 214 and the upper outlet passage 234 (e.g., in the heater passage 217) rather than passing to the upper outlet passage 234, and gradually cools down as the heater 210 cools down (e.g., after being switched off). In this configuration, the upper outlet passage receives and outputs substantially only the bypass stream once the bypass door 250 is opened.

Referring now to FIG. 6, the HVAC system 200 is shown with a two-stage temperature output, according to an exemplary embodiment. The HVAC system 200 may include a lower (i.e., second) outlet passage 236. The lower outlet passage 236 may be fluidly coupled to various vents in the passenger compartment (e.g., via ducts, passages, conduits, etc.). According to an exemplary embodiment, the upper outlet passage 234 may be configured to supply an upper output stream to defrosting vents and/or upper vents directed generally toward occupants' faces. The lower outlet passage 236 may be configured to supply a lower (i.e., second) output stream to lower vents directed generally toward occupants' feet (e.g., a foot well). Flow through either of the upper outlet passage 234 and the lower outlet passage 236 may be controlled by a flow control device. The flow control device may be a vent, a valve, a door, or other suitable structure for controlling flow of the output streams. For example, the flow control device may include the vane 254 or other suitable stationary or articulating structure. A flow control device may be disposed downstream from each of the upper and lower outlet passages 234, 236. For example, when the flow control device for the lower outlet passage 236 is closed, air is not output from the lower outlet passage 236 and, due to pressure buildup in the lower outlet passage 236, substantially all of the second stream bypasses the lower outlet passage 236 and is received in the upper outlet passage 234. The flow control device may be configured to control flow between the lower outlet passage 236 and the upper outlet passage 234 to provide different flow settings to occupants (e.g., defrost only, face only, face and feet, feet only, defrost and feet, etc.). According to an exemplary embodiment, the flow control device may be disposed in other locations in the HVAC system 200.

Referring still to FIG. 6, the HVAC system 200 is shown providing a heated lower output stream to the lower outlet passage 236 and a mid-temperature upper output stream to the upper outlet passage 234. The upper output stream is at a lower temperature than the lower output stream. It may be desirable for occupant comfort to provide streams with different temperatures to the occupants. For example, as shown in FIG. 6, air directed toward the occupants' feet may be at a higher temperature than air directed to the occupants' faces.

As shown, the bypass door 250 is in the "open" position and the heater 210 is operated to output a heated second stream. At least a portion (i.e., a first portion) of the second stream is received through an outlet opening 238, defined between the lower outlet passage 236 and the heater passage 217, and into the lower outlet passage 236. Because the bypass door 250 is in the "open" position, the first portion of the first stream has a higher velocity and is provided at a lower pressure than the second stream. A portion (i.e., a second portion, a remaining portion, etc.) of the higher-pressure second stream (i.e., a warming stream, a fourth stream, etc.) that is not received in the lower outlet passage 236 is then received by the upper outlet passage 234, due to the pressure differential between the second portion of the second stream and first portion of the first stream. The second portion of the second stream is combined in the upper outlet passage 234 with the first portion of the first stream to form the upper output stream at a temperature less than that of the second stream (e.g., less than that of the lower output stream) and greater than that of the first stream.

As described above, the vane 254 and the bypass door 250 may interact to provide the bypass stream as a substantially laminar flow. Due to the laminar properties of the bypass stream, substantially all of the bypass stream is passed to the upper outlet passage 234, rather than being diverted to the lower outlet passage 236.

Figure 7:
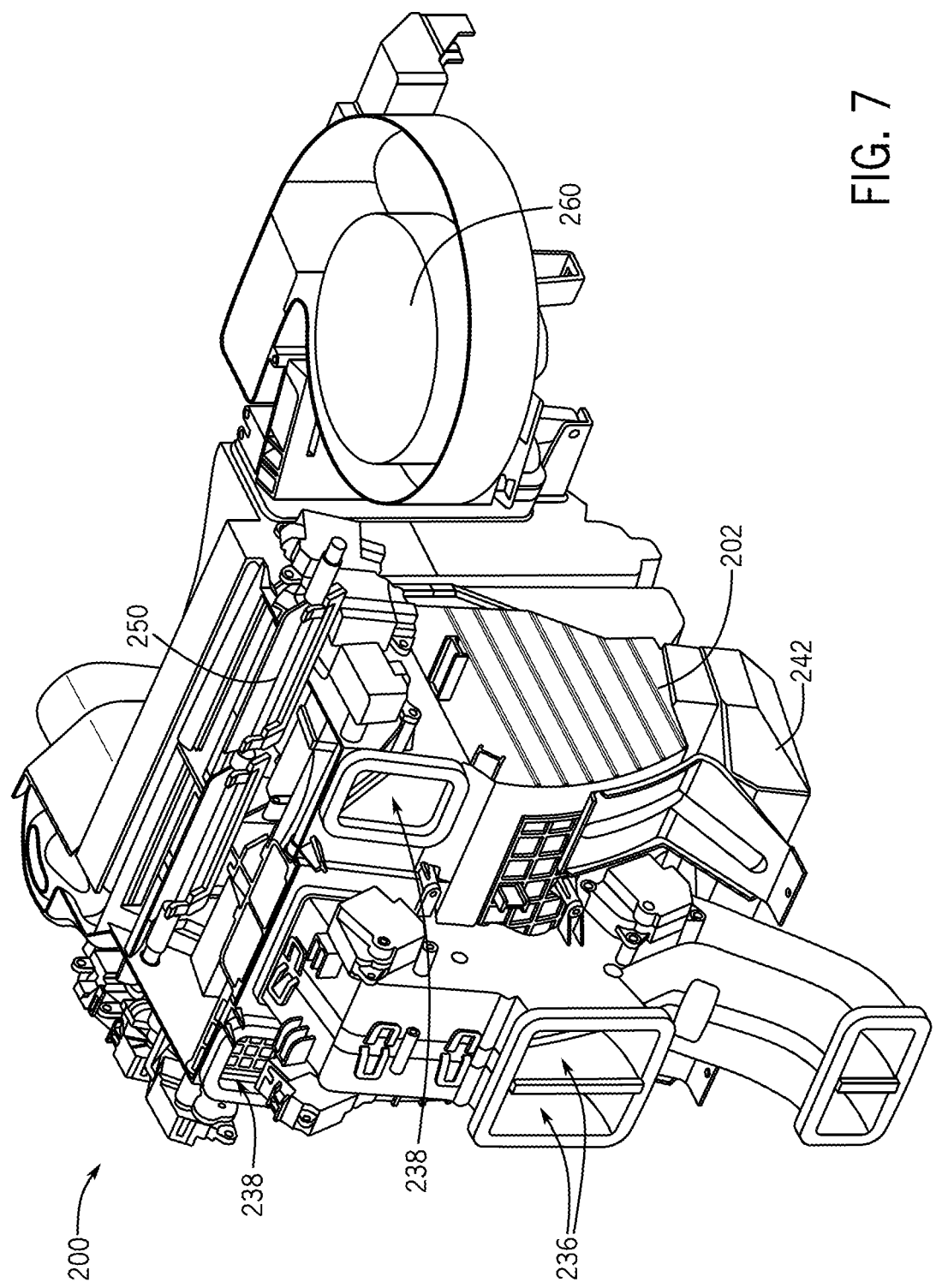
FIG. 7 is a perspective view of an HVAC system without an outlet passage, showing a bypass door, according to an exemplary embodiment.

Referring now to FIG. 7, the HVAC system 200 is shown according to an exemplary embodiment with the upper outlet passage 234 removed and the bypass door 250 is shown in the "open" position. As shown in FIG. 7, the bypass door 250 may be a single structure for controlling flow to more than one upper outlet passage 234. For example, the bypass door 250 may have the same orientation for each upper outlet passage 234, such that the mixture of the bypass stream and the warming stream is substantially the same in each upper outlet passage 234, providing upper output streams at substantially the same temperature. According to another exemplary embodiment, for a climate control system with more than one climate zone in the passenger compartment, the bypass door 250 may be divided into separately-actuated sections, such that the mixture of the bypass stream and the warming stream may vary between different zones (e.g., between different corresponding upper outlet passages 234).

Referring now to FIG. 8, the heater 210 is shown in a multi-zone configuration, according to an exemplary embodiment. The coils 240 are shown in a substantially vertical orientation, extending upward from the controller 242. A plurality of dividers 244 extend between the heater 210 and the housing 202, such that the heater passage 217 is subdivided into a plurality of compartments 246 (i.e., channel, duct, subdivision, zone, passage, etc.) defined between adjacent dividers 244 or between an adjacent divider 244 and the housing 202. Each of the compartments 246 is configured to provide a separate climate control zone in the passenger compartment configured to provide an output stream at a desired temperature different than any of the other compartments 246. The dividers 244 may be aligned with and disposed on (e.g., engage, received against, etc.) the coils 240.

According to an exemplary embodiment, the coils 240 that the dividers 244 are disposed on may be non-functional (i.e., "dummy") coils 240 that do not receive current and therefore do not generate heat, although according to other exemplary embodiments, the coils 240 may be functional as described above. The use of non-functional coils 240 may increase the thermal separation adjacent compartments 246, such that the temperature of one compartment 246 does not affect the temperature of another compartment 246. The dividers 244 may be coupled (e.g., welded, bolted, riveted, etc.) to the corresponding coils 240, such that the dividers 244 sealingly engage the coils 240, fluidly separating adjacent compartments 246 in the heater passage 217. According to other exemplary embodiments, the dividers 244 may be disposed on but not coupled to the coils 240 or may be spaced apart from the coils 240. The coils 240 disposed within each compartment 246 may be separately controlled and set to different temperatures from other compartments 246. In this configuration, each zone in the passenger compartment may correspond to a different compartment 246 in the HVAC system 200. While FIG. 8 shows one heater 210 subdivided into four compartments 246, according to other exemplary embodiments, the heater 210 may include more or fewer compartments 246 (e.g., corresponding to more or fewer zones) or the HVAC system 200 may include more heaters 210.

Referring to FIGS. 4-8, the heater 210 is oriented in the HVAC system 200 such that the controller 242 is disposed at the lower end 213 of the heater 210 (e.g., rather than on a side thereof). In a system with HVAC zone splits (e.g., horizontally-extending compartments 246) substantially perpendicular to multi-zone splits of the heater 210 (e.g., defined by vertically-extending functional or non-functional coils 240), when two zones in the passenger compartment are set to the same desired temperature, the zone closer to the controller 242 will have a higher output temperature and the zone further from the controller 242 will have a lower output temperature. The coils 240 may be subject to thermal losses over a length of the coil 240 with losses increasing when measured further away from the controller 240. For example, the heat in the coil 240 may be greater in a portion of the coil 240 proximate to the controller 242 and may be less proximate to an opposing end of the coil 240 disposed away from the controller 242, forming a temperature gradient in the coil 240. In the vertical configuration of the compartments 246 shown in FIGS. 4-8, when different zones are set to substantially the same desired temperature, the temperature gradient contained within each corresponding compartment 246 is substantially the same as the temperature gradient in other compartments 246, preventing undesired output temperature difference between different zones (e.g., compartments 246).

While FIGS. 4-8 show the controller 242 disposed at the lower end 213 of the heater 210, according to other exemplary embodiments, the controller 242 may be disposed at other ends or surfaces of the heater 210. In either configuration, the coils 240 may extend generally vertically (e.g., upwardly) into the housing 202 and the dividers 244 may extend generally vertically (e.g., upwardly) aligned with and corresponding to the coils 240 and providing the compartments 246 in a generally vertical orientation. According to other exemplary embodiments, the coils 240 and/or the dividers 244 may have other orientations, such that the coils 240 in each compartment 246 provide a substantially similar temperature gradient when each compartment 246 is set to a substantially similar output temperature for a corresponding zone.

One embodiment relates to an HVAC system for a vehicle including a housing and an evaporator disposed in the housing, the evaporator configured to receive a supply of air. The HVAC system further includes a heater disposed in the housing downstream from the evaporator, the heater configured to receive a first stream of air output from the evaporator. The HVAC system further includes a bypass opening defined between an upper end of the evaporator and an upper end of the heater, and an intermediate chamber defined by the evaporator, the heater, the housing, and the bypass opening. The HVAC system further includes an upper outlet passage configured to receive, through the bypass opening, at least a portion of the first stream directly from the intermediate chamber.

According to one aspect of the embodiment, the upper outlet passage is fluidly coupled to the intermediate chamber without a mixing chamber defined therebetween.

According to another aspect of the embodiment, a bypass door is disposed in the bypass opening, the bypass door configured to move between an open and a closed position. In the open position, the at least a portion of the first stream is a bypass stream and is configured to pass through the bypass opening. In the closed position, substantially all of the first stream is configured to pass through the heater. The heater is configured to output a second stream therefrom.

According to another aspect of the embodiment, a vane is disposed in the upper outlet passage, the vane configured to interact with the bypass door in the open position to maintain the bypass stream in a substantially laminar flow.

According to another aspect of the embodiment, the vane is a door configured to move between an open and a closed position.

According to another aspect of the embodiment, the vane and the bypass door are configured to be substantially coplanar when the bypass door is in the open position.

According to another aspect of the embodiment, a lower outlet passage downstream from the heater and configured to receive at least a portion of the second stream from the heater.

According to another aspect of the embodiment, the upper outlet passage and the lower outlet passage are configured to supply air to a passenger compartment of a vehicle at different temperatures.

According to another aspect of the embodiment, the heater is a PTC heater, further comprising a controller and a plurality of coils extending upward therefrom.

According to another aspect of the embodiment, the controller is coupled to and disposed outside of the housing, and the coils extend into an interior portion of the housing.

Another embodiment relates to an HVAC system for a vehicle, including a heater disposed in a housing, the heater including a controller disposed at a lower end thereof, and a plurality of coils extending substantially upward from the controller. The HVAC system further includes a divider coupled to at least one coil. First and second compartments are defined on opposing sides of the divider, the first and second compartments configured to receive separate streams of air at different temperatures.

According to one aspect of the embodiment, the plurality of coils are configured to receive a current from the controller, such that the plurality of coils generates heat for heating the streams of air in each of the first and second compartments.

According to another aspect of the embodiment, electricity does not flow through the coil coupled to the divider.

According to another aspect of the embodiment, the coils disposed proximate to the first compartment are heated to a different temperature than the coils disposed proximate to the second compartment.

According to another aspect of the embodiment, the HVAC system further includes three dividers defining four compartments. Each compartment is configured to supply air at a different temperature to a corresponding zone of a vehicle passenger compartment.

According to another aspect of the embodiment, at least one of the first and second compartments is defined between the divider and the housing.

Another embodiment relates to a method of supplying more than one temperature in an HVAC zone in a vehicle, including outputting, from an evaporator, a first stream of air. The method further includes passing, through a bypass opening defined between the evaporator and a heater, a bypass stream comprising a portion of the first stream. The method further includes receiving, at the heater, a remaining portion of the first stream. The method further includes outputting, from the heater, a second stream at a different temperature than the bypass stream. The method further includes outputting, from an upper outlet passage, the bypass stream. The method further includes outputting, from a lower outlet passage, at least a portion of the second stream.

According to one aspect of the embodiment, the method further includes receiving the bypass stream at the upper outlet passage directly from the bypass opening.

According to another aspect of the embodiment, the method further includes receiving the bypass stream and a remaining portion of the second stream at the upper outlet passage, and outputting, from the upper outlet passage, an output stream at a lower temperature than the second stream.

According to another aspect of the embodiment, the method further includes heating the first stream in the heater, such that the second stream is at a higher temperature than the first stream.

According to another aspect of the embodiment, the method further includes cooling a supply of air in the evaporator, such that the first stream is at a lower temperature than the supply of air.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of this disclosure as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the position of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is to be understood that although the present invention has been described with regard to preferred embodiments thereof, various other embodiments and variants may occur to those skilled in the art, which are within the scope and spirit of the invention, and such other embodiments and variants are intended to be covered by corresponding claims. Those skilled in the art will readily appreciate that many modifications are possible (e.g., variations in sizes, dimensions, structures, shapes and proportions of the various elements, mounting arrangements, use of materials, orientations, etc.) without materially departing from the novel teachings and advantages of the subject matter described herein. For example, the order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure.

What is claimed is:

1. An HVAC system for a vehicle, comprising:
   a housing;
   an evaporator disposed in the housing;
   an electronic heater disposed in the housing;
   a bypass opening defined between an upper end of the evaporator and an upper end of the electronic heater;
   an intermediate chamber defined by the evaporator, the electronic heater, the housing, and the bypass opening;
   an upper outlet passage configured to direct air from the HVAC system into a passenger compartment of a vehicle; and
   a bypass door disposed in the bypass opening, the bypass door configured to move between an open position and a closed position;
   wherein the evaporator is configured to output a first stream of air into the intermediate chamber and the HVAC system is configured to operate in a first operating condition in which the bypass door is in the open position and a second operating condition in which the bypass door is in the closed position;
   wherein the first condition is a maximum cold condition in which the electronic heater is switched off and a first portion of the first stream of air will pass through the electronic heater and a second portion of the first stream will bypass the electronic heater by passing from the intermediate chamber through the bypass opening and into the upper outlet passage; and
   wherein the second condition is a heating condition in which the electronic heater is switched on and all of the first stream will pass through the electronic heater such that the electronic heater will output a second stream that is warmer than the first stream.

2. The HVAC system according to claim 1, wherein the upper end of the electronic heater is at a height that is between the upper end of the evaporator and the height of half of the evaporator.

3. The HVAC system according to claim 1, wherein the electronic heater has a heat-generating part and an electric current-generating device positioned under the heat-generating part, and wherein the heat-generating part includes a heat sink.

4. The HVAC system according to claim 1, wherein the upper outlet passage is fluidly coupled to the intermediate chamber without a mixing chamber defined therebetween.

5. The HVAC system according to claim 1, further comprising a vane disposed in the upper outlet passage, wherein the vane is configured to interact with the bypass door when the bypass door is in the open position to maintain the bypass stream in a laminar flow.

6. The HVAC system according to claim 5, wherein the vane is a door configured to move between an open position and a closed position.

7. The HVAC system according to claim 5, wherein the vane and the bypass door are configured to be substantially coplanar when the bypass door is in the open position.

8. The HVAC system according to claim 1, further comprising a lower outlet passage downstream from the electronic heater and configured to receive at least a portion of the second stream from the electronic heater.

9. The HVAC system according to claim 8, wherein the upper outlet passage and the lower outlet passage are configured to supply air to a passenger compartment of a vehicle at different temperatures.

10. The HVAC system according to claim 1, wherein the electronic heater is a PTC heater that comprises a plurality of coils extending into an interior portion of the housing.

11. An HVAC system for a vehicle, comprising:
    a heater disposed in a housing, the heater including:
       a controller disposed at a lower end thereof; and
       a plurality of coils extending substantially upward from the controller; and
       a divider disposed on at least one coil;
    wherein first and second compartments are defined on opposing sides of the divider; and
    wherein the first and second compartments are configured to receive separate streams of air at different temperatures.

12. The HVAC system according to claim 11, wherein the plurality of coils are configured to receive a current from the controller, such that the plurality of coils generates heat for heating the streams of air in each of the first and second compartments.

13. The HVAC system according to claim 11, wherein electricity does not flow through the coil on which the divider is disposed.

14. The HVAC system according to claim 11, wherein a first portion of the coils are disposed proximate to the first compartment and a second portion of the coils are disposed proximate to the second compartment; and
    wherein the first portion of the coils are heated to a different temperature than the second portion of the coils.

15. The HVAC system according to claim 12, further comprising three dividers defining four compartments;
    wherein each compartment is configured to independently control a temperature of air supplied to a corresponding zone of a vehicle passenger compartment.

16. The HVAC system according to claim 12, wherein at least one of the first or second compartments is defined between the divider and the housing.

* * * * *